Sept. 28, 1965  A. E. MOULTON  3,208,767
TELESCOPIC SPRING SUSPENSION SYSTEMS FOR THE FRONT
WHEEL OF A TWO-WHEELED CYCLE VEHICLE
Filed Oct. 14, 1963  3 Sheets-Sheet 2

INVENTOR
ALEXANDER ERIC MOULTON
BY
Shoemaker and Mattare
ATTORNEYS

Sept. 28, 1965  A. E. MOULTON  3,208,767
TELESCOPIC SPRING SUSPENSION SYSTEMS FOR THE FRONT
WHEEL OF A TWO-WHEELED CYCLE VEHICLE
Filed Oct. 14, 1963  3 Sheets-Sheet 3

INVENTOR
ALEXANDER ERIC MOULTON
BY
ATTORNEYS

United States Patent Office 3,208,767
Patented Sept. 28, 1965

3,208,767
TELESCOPIC SPRING SUSPENSION SYSTEMS FOR THE FRONT WHEEL OF A TWO-WHEELED CYCLE VEHICLE
Alexander Eric Moulton, Bradford-on-Avon, England, assignor to Moulton Consultants Limited, Bradford-on-Avon, England, a British company
Filed Oct. 14, 1963, Ser. No. 315,986
Claims priority, application Great Britain, Oct. 19, 1962, 39,734/62
11 Claims. (Cl. 280—276)

This invention is concerned with providing a resilient telescopic suspension system for the front wheel of a two-wheeled cycle vehicle and in particular for a vehicle of the kind in which the front wheel is of relatively small diameter, that is 14 to 19 inches overall, for example as described in my United States patent specification No. 3,083,039.

In my United States patent specification No. 3,083,038 there is described a resilient telescopic suspension system for the front wheel of a two-wheeled vehicle and the present invention is concerned with improvements or modifications of the invention described in said last mentioned specification.

Resilient telescopic suspension systems for the front wheels of two-wheeled cycle vehicles have hitherto been of two main types.

In one type the front wheel spindle is resiliently carried by means of two telescoping struts, one on either side of the wheel. Each of the struts has contained resilient means adapted to resist the telescoping of the strut while hydraulic damping means have often been provided to regulate the performance of the strut, particularly in rebound. Such systems while being suitable for motorcycles are complicated and expensive to manufacture, they are also heavy and cumbersome and for these reasons they are unsuitable for light vehicles such as bicycles.

In the second type which is more suitable for bicycles, a single telescopic strut is employed which must perform the combined functions of positively locating the wheel, resisting and controlling upward and downward movements of the wheel and transmitting pivotal movements from the handlebars to the wheel to enable the vehicle to be steered. In order to perform all these functions effectively such single struts have often been complicated and cumbersome.

The present invention is concerned with providing an improved resilient suspension system of the single telescopic type and has among its objects:

(1) To provide firm support for the wheel while at the same time allowing pivotal movement of the wheel in the steering mode on the one hand and sliding movement of the telescoping elements without friction or binding on the other.

(2) Positive and accurate transmission of steering movement between the handlebars and the front wheel with a minimum of friction, or lost motion.

(3) Smooth springing with progressive resistance to upward movement of the wheel and decreasing resistance as the wheel moves downwardly. An important requirement is that there should be no possibility of the spring means causing jamming or binding of the telescoping elements.

(4) To provide a self-contained resilient telescopic front fork unit which can be assembled separately and then fitted as a whole to the cycle vehicle with a minimum of effort and skill.

(5) The system must require a minimum of cleaning, maintenance and lubrication while, when necessary, worn parts may be simply and easily replaced.

(6) The system must take up a minimum of space, and advantageously the majority of its components should be capable of being housed within a frame element of the vehicle so that the danger of dirt and water entering the system is removed, as is the danger of the fingers or clothing of the rider being inadvertently trapped in the mechanism.

As will be appreciated, the majority of bicycles have a substantially upright head tube in which the steering means for the front wheel are housed. The system according to the invention is principally intended for bicycles and is, therefore, required to have small dimensions so that it can be housed in the confined space within such a head-post while all the above listed requirements and functions are obtained and performed.

In the accompanying drawings, showing one embodiment of the invention,

FIGURE 2 is an elevational view part broken away, while

Figure 1:
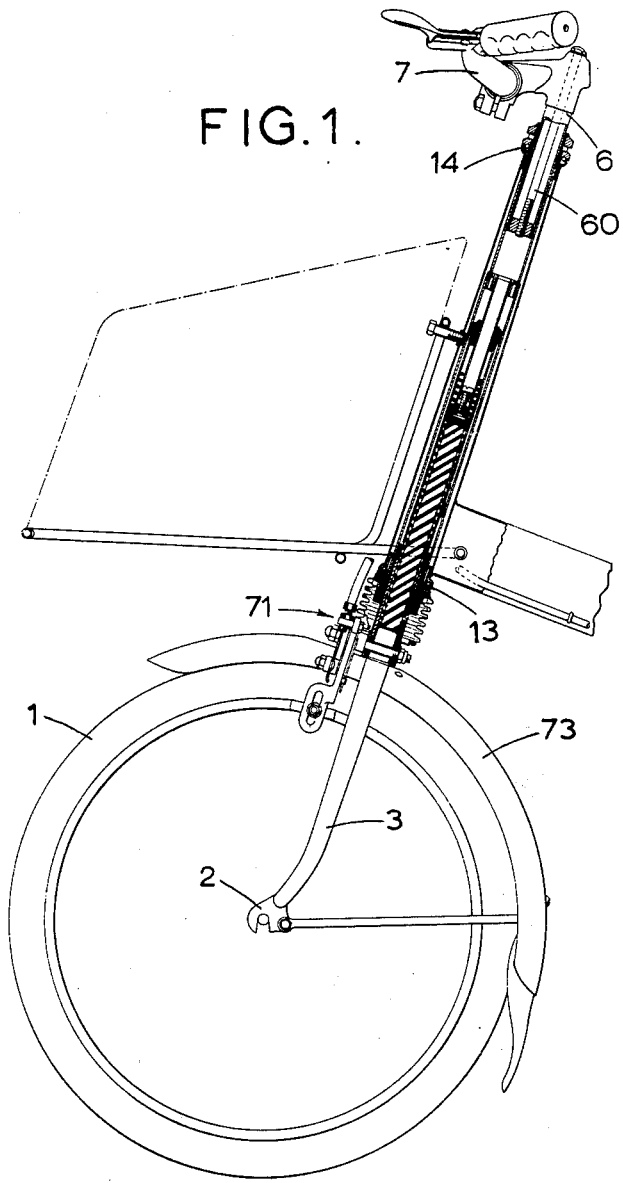
FIGURE 1 is a part sectional side elevation of the suspension of the front wheel of a two-wheeled cycle vehicle.
Figure 2:
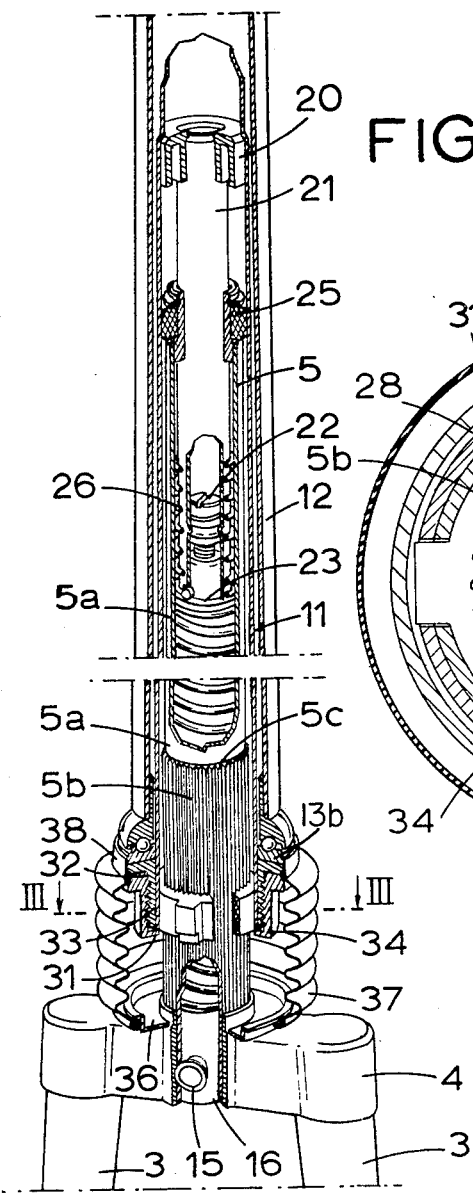

Referring now to the drawings, the spindle of the front wheel 1 is mounted at the lower ends 2 of a pair of fork arms 3 which are raked forwardly and bridged together at their upper ends by a crown 4.

Extending upwardly from the crown 4 is a fork tube generally designated 5 mounted for telescopic axial movement within a tubular steering column 11.

The steering column 11 is mounted within a head tube 12, which forms part of the frame of the vehicle, by widely spaced ball bearing assemblies 13 and 14, the arrangement being such that the steering column 11 is rotatable about its axis but is prevented from axial movement relative to the head tube 12.

In the upper end of the steering column 11 there is fitted a conventional handle bar stem 6 surmounted by handle bars 7.

Fixed within the bore of the steering column 11 near its upper end, is a bush 20 from which depends a tubular stool 21.

A bush 25, suitably of sintered bronze, nylon or the like self-lubricating material, serves to support the upper end of the fork tube 5 axially of the steering column 11, while a bush 24 bears on the tubular stool 21.

In the bore of the stool 21 is a bolt 22 at whose lower end is screwed a flanged abutment 23. Between the flanges of the abutment 23 and the bush 25 is a coil spring 26 which serves as a rebound spring.

The fork tube 5 is formed of upper and lower sections 5a and 5b joined together at 5c. The lower section is fixed to the crown 4 and has external longitudinal spline ribs. The internal diameter of the splined section 5b is the same as that of the section 5a so that it effectively forms a downward extension of the latter.

Closing the lower end of the splined tube 5b is an abutment 16, located in the crown 4 by a dowel pin 15, between which and the abutment 23 is a tubular block of rubber 27 surrounded by a steel coil spring 28. The spring 28 serves both to support the rubber block 27 within the bore of the sections 5a and 5b of the fork tube 5 and, in conjunction with the rubber block 27, as a compression spring resiliently resisting upward telescopic axial movement of the fork tube 5 within the steering column.

At its lower end the steering column is formed with four downwardly projecting lugs 31 and a sleeve member 32 is brazed to the exterior of the column 11 and has lugs 33 coinciding with the lugs 31. The sleeve 32 thus strengthens the steering column 11 in the region of the lugs 31. At its upper end the sleeve member 32 has a flange adapted to bear against the lower bearing ring 13b of the ball-race assembly 13, the ring 13b being a press fit, from above, over the steering column 11. Externally, the sleeve member 32 is threaded, in the region of the lugs 33 to take a nut member 34 which is adapted to retain a bush 30 within the lower end of the steering column 11.

Figure 3:
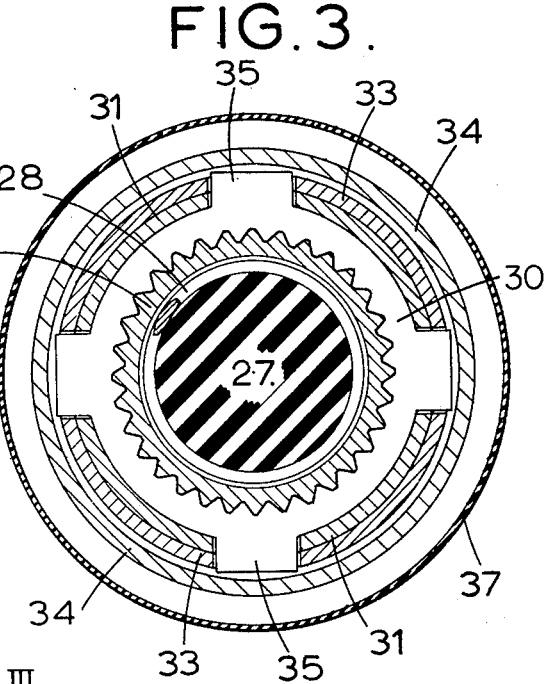
FIGURE 3 is a cross-sectional view, to larger scale, taken on the lines III—III of FIGURE 2.
Figure 4:
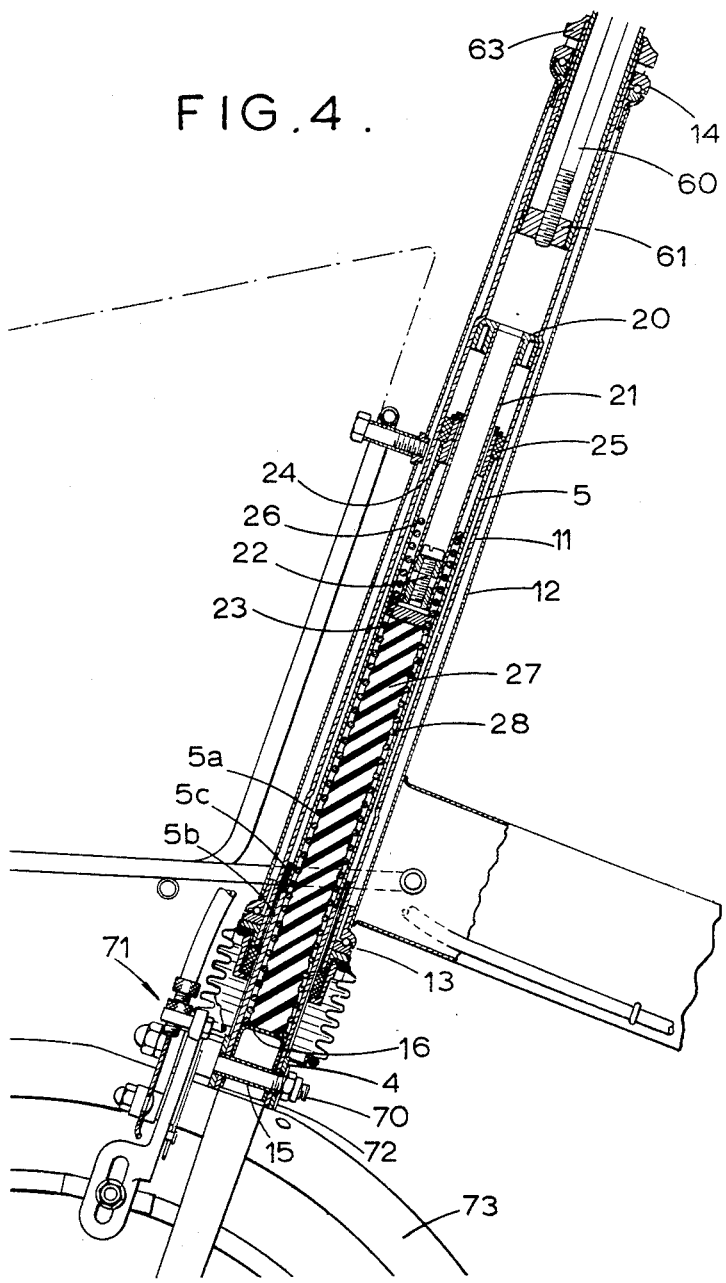
FIGURE 4 is a detail side view also in cross-section.

The bush 30 is preferably of nylon and as shown in FIGURE 3, it is formed internally with spline ribs interengaging with the external spline ribs of the lower section 5b of the fork tube 5. Externally the bush 30 has projections 35 engaging between the lugs 31 and 33 and by which it is constrained to rotate with the steering column 11 when the latter is rotated by the handlebars 7 relative to the head tube 12, with the bearing assemblies 13 and 14 supporting such rotation.

The splined engagement between the bush 30 and the lower section 5b of the fork tube 5 enables rotational movement of the steering column 11 to be transmitted to the fork tube 5 and to the crown 4 and thence via the arms 3 to the front wheel 1. At the same time this splined connection between the bush 30 and the tube 45 enables the latter, together with the fork tube 5, to move axially of the steering column 11 with the bush 30 providing efficient guidance for the lower end of the inner telescoping element of the assembly.

36 represents a locating ring surrounding the lower end of the section 5b and trapping at its periphery the lower bead of a rubber bellows 37 adapted to protect the telescoping elements against ingress of dirt. The upper bead of the bellows 37 is trapped between the nut 34 and the sleeve 32, there being a short cylindrical portion 38 which protects the bearing 14 to some extent.

In operation, wheel shocks in bump are transmitted by the forks 3 to the fork tube 5 upstanding from the crown 4, the tube moving upwardly, and telescopically, within the steering column 11. Such upward movement causes resilient deformation, in compression, of the rubber block 27 and of the coil spring 28 between the abutment 23, which is fixed in relation to the steering column 11, and the abutment 16 which is fixed at the lower end of the fork tube 5. Movement in bump is determined when the flange at the lower end of the sleeve member 34 abuts with the locating ring 36 of the rubber bellows 37, although this limit will not normally be reached, owing to the resistance of the compression springs 27 and 28.

In rebound, when the fork tube 5 moves downwardly within the steering column 11, the rebound spring 26 is compressed between the abutment 23 and the bush 25 carried at the uper end of the fork tube 5, the maximum deflection allowed by the spring 26 limiting the stroke of the suspension in rebound.

Although in the above described embodiment the compression spring means is constituted by a block of rubber surrounded by a helical steel spring, either a rubber block or a steel coil spring or any other suitable compression spring means may be employed independently or in combination as an alternative.

In the embodiment illustrated, the overall diameter of the wheel 1, including its tyre is 16 inches while the bearings 13 and 14 which support the wheel through the medium of the telescoping elements for rotational movement relative to the head tube 12 are some 4½ inches apart.

The distance between these bearings in relation to the size of the wheel is thus considerably greater than that commonly found in bicycles and adequate support for the steering column 11 within the head tube is thereby ensured. This however, will be of no avail in a telescopic system, unless adequate support is also provided for the movable member of the system, i.e. the inner telescoping element comprised by the fork tube 5. Such support is provided according to the present invention by the bushes 25 and 30 which are also a considerable distance apart in relation to the stroke of the unit so that the inner telescoping element is positively guided for axial movement within the steering column 11.

An important feature of the present invention is that the bush 30 acts both as a bearing supporting the lower end of the inner telescoping element 5, as it slides within the steering column 11, and also as the means transmitting rotary movement from the steering column 11 to said inner telescoping element to enable the front wheel to be steered. When the bush 30 is made of nylon a smooth sliding action is ensured for the splined section 5b, with servicing and lubrication being virtually unnecessary subsequent to initial assembly. Should the bush require attention, however, it is readily replaceable upon removal of the nut member 34. As will be seen from the drawings the bush is of substantial diameter in relation to that of the bush 25 (taken for example since in my United States patent specification No. 3,083,038 it is proposed that this bush should be employed for the dual function of (a) acting as a bearing supporting the upper end of the fork tube 5 for sliding movement and (b) transmission of rotary movement in the steering mode by being in splined engagement with the external periphery of the stool 21, and this relative size renders the bush 30 the more suitable for performing this dual function with no danger arising of under wear and jamming taking place. It will also be appreciated that steering movement is conveyed to the inner telescoping element 5 at its widest point and near to the crown 4 so that the possibility of lost motion due to torsion of the tubes is reduced to a minimum. In the embodiment illustrated the bush 30 has a large number of internal spline ribs, thirty-two as illustrated, and this ensures positive engagement with the corresponding spline ribs of the section 5b. The large number of ribs ensures that the intervening grooves are not so deep as to weaken the elements 30 and 5b.

A further advantageous feature of the invention is that the spring (whether a rubber block or a steel coil or a combination of both is employed) is wholly contained within the inner telescoping element, i.e. the fork tube 5 constituted by the sections 5a and 5b, with the internal diameter of the latter being substantially constant. This feature is made possible by the provision of the stool 21, which extending downwardly into the upper end of the fork tube 5, provides an upper abutment for the spring which is within the tube 5. This arrangement ensures that the spring means cannot become distorted and move between the telescoping members to prevent movement of the latter since the spring is supported over the whole of its length.

Where a combination of a rubber block 27 and a steel coil 28 is employed for the spring means as shown, the steel spring supports the rubber and the spaces between its convolutions provide areas into which the rubber can move as it is deflected in compression. The provision of the rubber spring enables the suspension to have a rising rate, i.e. resistance to upward movement of the wheel progressively increases according to the degree of displacement. Due to the well-known characteristic of rubber, termed hysteresis, the energy put into the spring as it is deflected in compression is partially dissipated, and converted into heat, so that the energy exerted by the spring to return the wheel to its normal position is significantly less. This characteristic enables a smooth and comfortable ride to be obtained from the suspension, with the required minor degree of damping being provided by this effect, i.e. hysteresis of the rubber spring and also, by friction of the telescoping elements. The spring 22 eliminates all possibility of harsh shocks occurring in the rebound mode.

As shown in FIGURE 1 the handle bar stem 6 is secured within the upper end of the steering column 11 by a bolt 60 which is rotated to draw a wedge nut 61 upwardly to cause the lower end of the stem 6 to expand into engagement with the column 11. Release of the nut 61 will enable the handlebars to be withdrawn.

Release of a nut 63 which is threaded on to the upper end of the steering column 11, will enable the resilient telescoping assembly to be withdrawn as a complete unit downwardly from within the head tube 12. Thus it will be appreciated that dismantling for servicing is easily performed, while in manufacture the forks 3 and all the components contained within the steering column 11 and the gaiter 37 may be assembled separately and fitted as a unit to the cycle vehicle by insertion from below into the head tube 12.

The resilient telescopic suspension forms a compact unit which may be housed inconspicuously in the relatively confined space available on bicycles, e.g. within the head tube 12. The only part of the assembly which is outside the tube 12 and which might be adversely affected by dirt, is protected by the gaiter 37. This system also precludes the possibility of the clothes or fingers of a rider being trapped in the mechanism. The system therefore constitutes no danger to children, in contra-distinction to some previous proposals.

It will be appreciated that the bicycle manufacturer may wish to market also bicycles whose front wheels are not arranged for resiliently controlled telescopic movement. In this case the steering column 11 is connected directly to the crown 4 and the elements inside the steering column are omitted, so that the system resembles the conventional front suspension system currently in use in bicycles.

A feature of the present invention is that the resilient telescopic suspension system now proposed is virtually identical with such an unsprung system as regards external dimensions, and so, given that both sprung and unsprung versions are adapted to fit with a standard head tube 12 with standard bearings 13 and 14, the versions are interchangeable with one another. Both sprung and unsprung versions will be fitted with the hollow dowel pin 15 in the crown 4 so that a bolt 70 can be passed through to clamp a brake assembly generally designated 71 in front of the crown 4, and in rear thereof a lug 72 for a mudguard 73. The possibility of interchangeability between sprung and unsprung versions is of obvious advantage to the bicycle manufacturers as regards assembly, storage and servicing and to the rider since the bicycle can be readily modified to suit his requirements in this respect.

I claim:
1. A resilient suspension and steering assembly for the front wheel of a bicycle having a frame, a first tubular member rotatably mounted within said frame, a second tubular member axially slidable within said first tubular member, a spline means slidably connecting said tubular members and preventing relative rotation therebetween, a handlebar secured to one of said tubular members, a wheel fork secured to the other of said tubular members, compression spring means mounted within said tubular members and resisting relative axial movement therebetween, said spring means comprising a cylindrical bar of rubber enclosed in a steel coil spring, means preventing axial movement relative to the frame of the tubular member which is secured to said handlebar, and said spline means comprising an annular bearing bush fixed at one end of said first tubular member and prevented from rotation relative thereto, said bush having an internally splined portion and said second tubular member having externally a longitudinally splined portion slidable within and in splined engagement with the splined portion of said bush.

2. An assembly as defined in claim 1, wherein the handlebar includes a downwardly extending stem expanded into frictional engagement with the interior of said first tubular member.

3. An assembly as defined in claim 2, wherein said annular bearing bush is fixed at the end of said first tubular member remote from said handlebar.

4. An assembly as defined in claim 1, wherein said compression spring means is confined wholly within said second tubular member, an abutment secured to said second tubular member engaging one end of said spring means, a stool member secured within and to said first tubular member extending axially into said second tubular member and engaging the other end of said spring means.

5. An assembly as defined in claim 4, wherein said spring means is compressed when said fork moves toward said handlebar, and including rebound spring means compressed between a bushing fixed to said second tubular member and said stool adapted to resist movement by said fork away from said handlebar.

6. An assembly as defined in claim 5, wherein said rebound spring means comprises a coil spring surrounding said stool, said stool including a head on its lower end extending between and engaging both said spring means, the upper end of said rebound spring means abutting said bushing.

7. An assembly as defined in claim 1, wherein said tubular members extend below a bearing means of said frame, said second tubular member extending below said first tubular member, a flexible sleeve enclosing a lower end portion of said second tubular member and having its opposite ends secured to the lower ends of said tubular members.

8. An assembly as defined in claim 1, wherein said compression spring means is confined wholly within said second tubular member, an abutment secured to said tubular member engaging one end of said spring means, a stool member secured within and to said first tubular member extending axially into said second tubular member and engaging the other end of said spring means, and including a bushing secured on the end of the second tubular member through which the stool extends, said bushing having on the one hand a part bearing on the stool and on the other hand a part bearing on the internal bore of the first tubular member.

9. An assembly as defined in claim 8, wherein the part of the bushing bearing on the internal bore of the first tubular member is of nylon.

10. An assembly as defined in in claim 1, wherein said annular bearing bush is of nylon.

11. An assembly as defined in claim 1, wherein said annular bearing bush is of sintered bronze.

References Cited by the Examiner

UNITED STATES PATENTS

| | | | |
|---|---|---|---|
| 51,368 | 12/65 | Vose | 267—33 |
| 2,196,089 | 4/40 | Wallace | 257—64 |
| 2,683,044 | 7/54 | Seddon | 280—276 |
| 2,756,070 | 7/56 | Torre | 280—276 |
| 2,823,055 | 2/58 | Booth. | |
| 2,831,737 | 4/58 | Jacoby. | |
| 3,083,038 | 3/63 | Moulton | 280—276 |

FOREIGN PATENTS

| | | |
|---|---|---|
| 26,921 | 12/23 | France (1st addition to No. 551,213) |
| 677,058 | 8/52 | Great Britain. |
| 239,138 | 12/45 | Switzerland. |

MILTON BUCHLER, *Primary Examiner.*

KENNETH H. BETTS, *Examiner.*